United States Patent [19]

Juskevic

[11] 4,256,423
[45] * Mar. 17, 1981

[54] KEY CUTTING MACHINE

[76] Inventor: John Juskevic, 7228 Orchard, Dearborn, Mich. 48126

[*] Notice: The portion of the term of this patent subsequent to Feb. 12, 1997, has been disclaimed.

[21] Appl. No.: 65,933

[22] Filed: Aug. 13, 1979

[51] Int. Cl.³ .............................................. B23C 1/16
[52] U.S. Cl. ...................................... 409/82; 76/110; 409/81
[58] Field of Search ...................... 76/110; 409/82, 83, 409/81

[56] References Cited

U.S. PATENT DOCUMENTS

| | | | |
|---|---|---|---|
| Re. 26,848 | 4/1970 | Simon | 76/110 X |
| 1,889,461 | 11/1932 | Hansen | 409/82 X |
| 1,923,164 | 8/1933 | Roos | 409/82 |
| 2,129,883 | 9/1938 | Stull | 409/82 |
| 2,158,761 | 5/1939 | Olson | 409/82 |
| 3,011,411 | 12/1961 | Raymond | 409/82 |
| 3,440,906 | 4/1969 | Allen | 76/110 |
| 3,791,240 | 2/1924 | Meoni | 76/110 |
| 3,919,920 | 11/1975 | Schlace | 409/82 |
| 4,132,151 | 1/1979 | Weber | 409/82 |
| 4,188,163 | 2/1980 | Juskevic | 409/82 |

FOREIGN PATENT DOCUMENTS 1209847  1/1966  Fed. Rep. of Germany ............ 76/110

*Primary Examiner*—William R. Briggs
*Attorney, Agent, or Firm*—Cullen, Sloman, Cantor, Grauer, Scott & Rutherford

[57] ABSTRACT

A key cutting machine formed of a non-movable, horizontal shaft and an L-shaped lever centrally journalled upon the shaft for sliding and pivoting movement. A vise mounted upon the end of the horizontal part of the lever holds a key blank. A stylus mounted upon the vertical end of the lever contacts and moves upon a guide surface. This causes the lever to pivot, to conform to the shape of the guide surface, as it moves in the direction of the shaft. A cutter blade mounted above the vise engages and cuts the blank in accordance with the lever movement. The guide surface is formed by a series of disks which are axially aligned about a horizontal axis that is parallel to the shaft axis. The adjacent disks are arranged in face-to-face contact with each other and are relatively rotatable about their respective axes. The peripheral edge of each disk is provided with a series of steps, and corresponding indicia are provided remotely from the steps on the periphery of each disk so that the disks can each be rotated into pre-determined indicia positions, to thereby align pre-selected steps for contact by the stylus.

5 Claims, 10 Drawing Figures

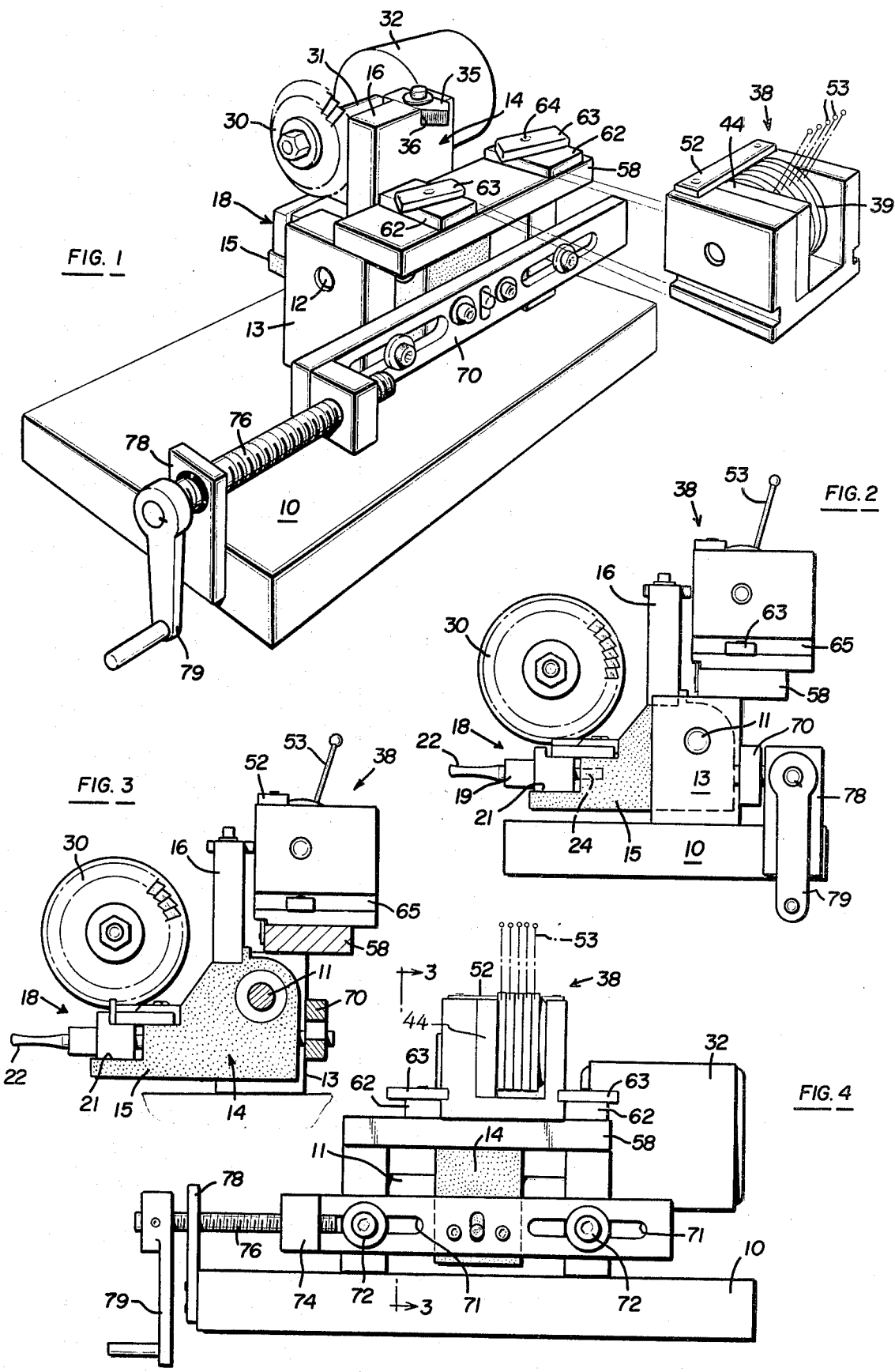

KEY CUTTING MACHINE

BACKGROUND OF INVENTION

Conventional key cutting machines which are used for duplicating pre-existing keys, usually include a vise for holding a key blank, a cutting wheel for engaging the edge of the key blank and a stylus for tracing the shaped edge of the existing key. A connection between the stylus and the vise or the cutter moves the blank edge relative to the cutter pursuant to the stylus movement. This reproduces the existing key edge on the blank. Such available key cutting machinery is normally not able to cut a key blank in the absence of the original or master key.

In many types of keys, particularly those used for automotive vehicles, the shaped edges of the keys are produced in accordance with a coded system. A limited number of key edges are used, with each identified by a code number. For example, there may be dozens of different key edge contours for a particular manufacturer's model year. Each edge is made up of a number of short segments, which can be varied to produce the composite shaped edge of the particular coded key. Thus, the shaped edge is known or identifiable in accordance with a code number, which permits a keymaker to utilize a known master key from which duplicate keys can be made when the original key is not available. However, to produce duplicate keys, the keymaker must keep a number of masters on hand or else have some other sort of system to reproduce the shape of the original. Prior key making equipment which reproduce duplicate keys from the known code, without an original key to trace, has not been readily available, possibly because of complexity and expense.

Thus, the invention herein relates to a key cutting machine of a simplified, inexpensive construction which utilizes an adjustable guide which simulates the shape of a master key edge, without an original key, to permit the machine to cut blanks into shapes corresponding to known code numbers.

SUMMARY OF INVENTION

The invention herein contemplates a key cutting machine which utilizes a guide device that is quickly arranged into a master key edge shape by merely turning a series of guide forming disks into known code numbered positions. Thus, a simulated master key edge is temporarily fabricated. This edge is traced by a stylus to reproduce its shape upon a blank.

The machine includes an L-shaped lever which is mounted upon a fixed position shaft for rocking movement about, and longitudinal movement along, the axis of the shaft. The lever is arranged so that one of its legs is approximately horizontal and the other approximately vertical, with a key blank holding vise formed on the horizontal leg and a stylus mounted on the vertical leg. A conventional key blank cutting wheel is rotatably mounted above the vise so that the key blank may be moved into contact with the cutting edge. The guide which simulates a master key is arranged alongside of the vertical leg of the L-shaped lever for forming a guide path for the stylus.

The guide means is formed of a plurality of approximately circular, flat disks which are axially aligned and arranged together so that adjacent disks are in face to face contact. The disks together form a cylindrical shaped drum. Each of the disks is provided with a series of steps of successive depth, that is, relative to the peripheral edge of the disk. The disks are identical in size and shape, although their thicknesses may be varied.

Each disk is provided with indicia which correspond to a related step portion on that disk. Therefore, selection of a particular indicia and moving it into alignment with a marker, positions its corresponding step along a stylus guide path or guide surface. The alignment of the various steps of all of the disks forms a continuous surface which simulates the edge of a master key or a pre-existing key. The thickness of each disk determines the length of the key segment corresponding to its particular depth steps. Thus, the stylus moves along a continuous path of varying depth, so that the stylus moves in and out relative to the axis of the cylinder. The stylus movement pivots the lever about the shaft as the lever travels longitudinally of the shaft to cause the blank to correspondingly move relative to the cutting blade.

An object of the invention is to provide a simulated master key arrangement, pursuant to a known code, by means of a series of disks having step-like portions formed on their peripheral edges and corresponding indicia for rapidly selecting and positioning such step-like portions into stylus guiding positions. This permits the rapid and simplified production of duplicate keys without the need for stocking master keys, simply by utilizing known code numbers.

A further object of this invention is to provide a simplified, inexpensive key cutting machine having a minimum number of moving parts and which can be operated by an untrained, unskilled person to produce accurate duplicate keys.

A further object of this invention is to form the key guide means, and the stylus tracing device in a manner as to be readily observable by the operator of the machine. The key blank edge likewise is positioned in a readily observable position during the cutting operation. Consequently, the machine is easy to operate.

Still another object is to provide an interchangeable key holding vise to temporarily replace the guide so that an actual physical key can be reproduced by a stylus tracing its edge. With that additional vise the machine is dual purpose, that is, it can be used either with a key or without a key. Temporarily interchanging the second vise and guide can be accomplished rapidly, without tools or skill.

These and other objects and advantages of this invention will become apparent upon reading the following description, of which the attached drawings form a part.

DESCRIPTION OF DRAWINGS

FIG. 1 is a perspective view of the key cutting machine.

FIG. 2 is an elevational, end view, showing the machine.

FIG. 3 is an end view, in cross-section, taken in the direction of arrows 3—3 of FIG. 4.

FIG. 4 is an elevational front view of the machine.

DETAILED DESCRIPTION

Figure 5:
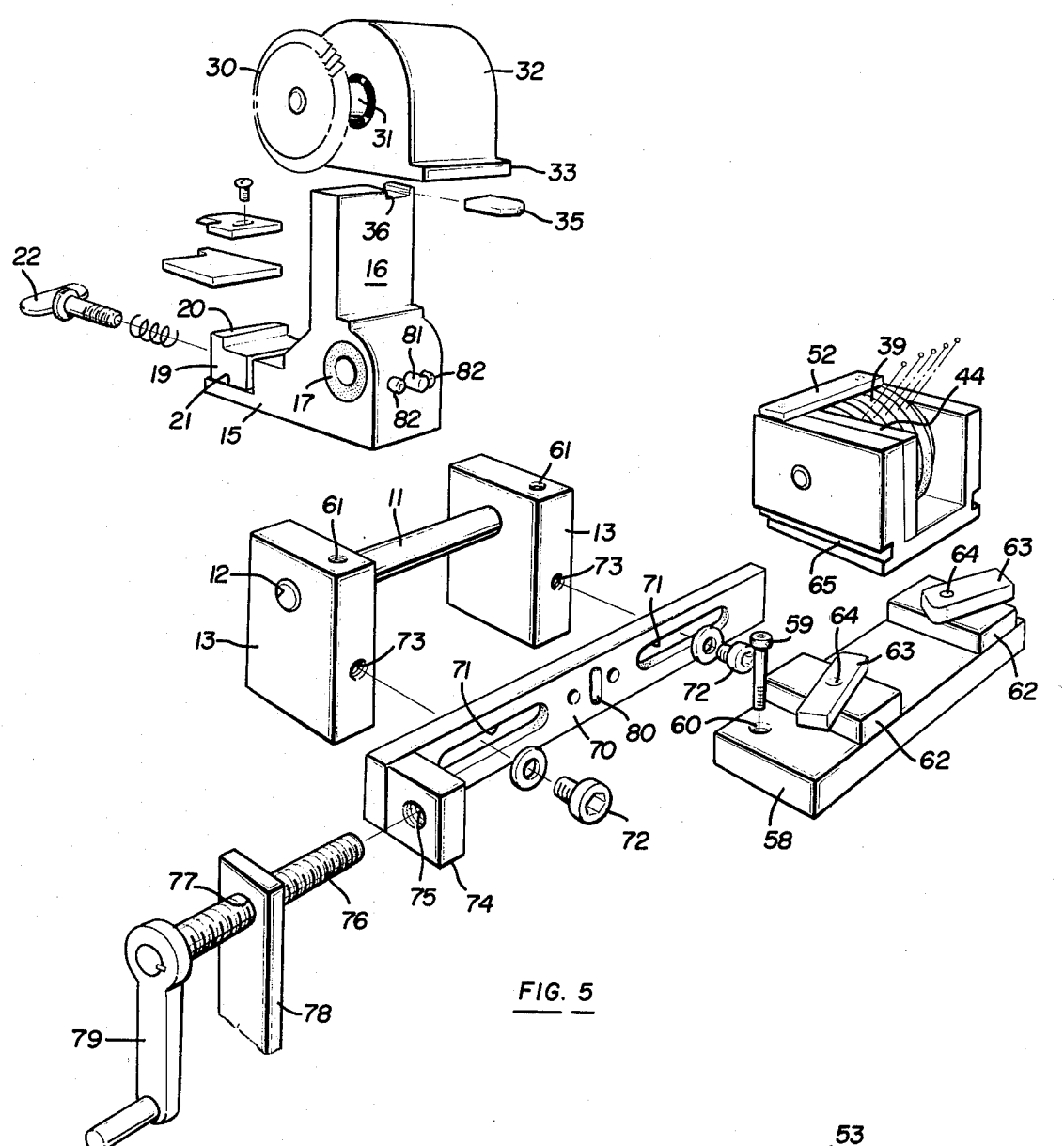
FIG. 5 is a perspective view of the disassembled parts forming the key cutting machine.
Figure 6:
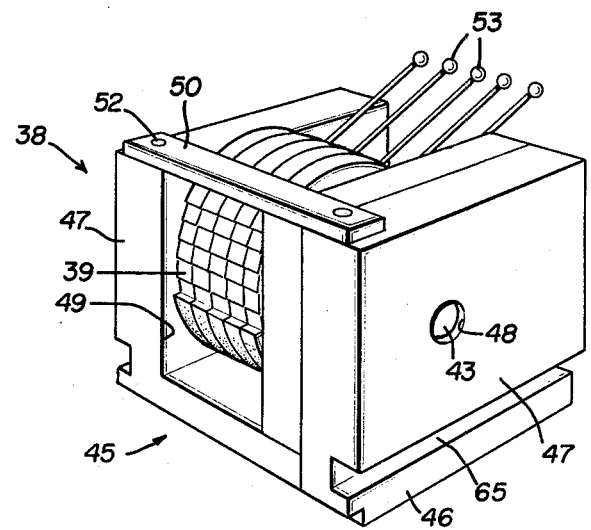
FIG. 6 is a perspective view of the guide means.

The key cutting machine includes a base or table 10 upon which is mounted an immovable or fixed position, horizontal shaft 11. The opposite ends of the shaft are secured within openings 12 formed in spaced apart bracket plates 13 which are fastened to the base 10. An L-shaped lever 14, having a horizontal leg or arm 15 and a vertical leg or arm 16, is carried upon the shaft 11 which extends through an opening 17 formed in the lever. The lever may pivot or rock about the shaft and also is longitudinally movable in the direction of the axis of the shaft.

A key blank holding vise 18 is mounted upon the free end of the horizontal arm 15. The vise is formed of a block 19 having an upwardly extending, edge flange 20. The block is arranged within a rabbet slot 21. A thumb screw 22 extends through an opening 23 in the block and is received within a threaded opening 24 in the arm so that by turning the thumb screw, the block may be moved in a horizontal direction.

An upper bearing plate 25 is fastened to the horizontal arm by means of a screw 26. The outer end of the plate, i.e., the end most remote from the axis of the shaft, together with the edge flange 20, defines a slot 27 within which a key blank 28 is positioned. The key blank is releaseably clamped within the slot by turning the thumb screw 22. An adjustable stop 29, to be described hereinafter, positions the end of the key blank relative to the slot.

Positioned above the vise is a conventional key cutter wheel 30. The wheel is mounted upon the end of a drive shaft 31 connected to motor 32. The base 33 of the motor is fastened upon the base or table 10, either directly or upon spacer pads (not shown) to position the wheel in the manner described above.

A stylus 35 is fastened within a notch 36 formed on the upper end of the vertical arm 16. The stylus is arranged to contact and slide along a guide means 38 so that movement of the stylus in a direction transverse to the axis of the shaft 11 causes rotation of the lever. This moves the key blank towards and away from the cutting wheel for cutting the desired shape.

The guide means 38 includes a plurality of disks 39, which are flat, relatively thin, wafers formed of metal. The disks are arranged together, in axial alignment and face to face contact, to produce a cylinder-like or drum configuration. Each of the disks is provided with a number of steps or depression portions 40 which correspond in number to a predetermined number of steps or positions formed upon a typical key. The disks also include a series of indicium 41, such as a series of numbers accompanied by marks, each of which corresponds to a related step 40. A typical automobile ignition key may have five steps or segments, each segment being of the same length. Hence, since the thickness of each disk determines the length of the corresponding segment cut on the key blank, the disks are the same thickness. However, where key segment lengths vary, disk thicknesses similarly vary.

The disks are formed with central openings 42 which receive a shaft 43 upon which the disks rotate individually. A spacer 44 is also positioned upon the shaft. The thickness of the spacer may correspond to one or more disks, so that the number of disks may be increased by replacing the spacer with disks.

The group of disks are contained within a box-like frame 45 having a flat base 46 and spaced apart end walls 47. Openings 48 in the end walls receive the opposite ends of the shaft 43 upon which the disks are mounted.

The box face 49, which is adjacent the stylus, is open to expose the steps on the peripheral edges of the disks. Likewise, the top 50 of the box is also open to expose the indicia for easy viewing. A thin, marker strip 52 spans the end walls 47 and is fastened thereto by suitable screws. The edge of the marker strip forms a guide or marker for aligning the disk indicia markings in order to align predetermined steps along a guide surface or guide path along which the stylus travels as the lever is moved in the axial direction of the shaft.

In order to rotate the disks, suitable handles 53 are provided for each of the disks. Grasping the handle of a particular disk permits manual rotation thereto until a pre-selected indicia, i.e., a number printed upon the disk edge, is aligned with the marker strip 52 for thereby aligning a particular pre-selected step with the guide surface of guide path.

To hold the disks in predetermined positions, leaf springs 54 may be positioned within the box and secured to the base thereof. The leaf springs are provided with bent ends 55 which engage notches 56 formed in the disks. The cooperation between the springs and notches holds the disks in pre-selected locations.

The guide means 38 is secured upon a flat strip 58 (see FIG. 5) which is fastened by screws 59 to the bracket plates 13. The flat strip 58 overlaps the upper edges of the bracket plates 13 and the screws 59 extend through holes 60 in the strip and into threaded hold 61 in the upper ends of the bracket plates 13. A pair of spaced apart retainer rails 62 are fastened to the upper surface of the flat strip. The box-like frame 45 snugly fits between the rails. A swinging lever 63 fastened by a pivot pin 64 on each of the rails engages into an adjacent groove 65 formed in the end wall of the box-like frame for securing it upon the flat strip.

A horizontally elongated flat bar 70 extends between and overlaps the vertical edges of the bracket plates 13. The bar is provided with horizontally elongated slots 71 through which screws 72 are inserted for engaging within threaded holes 73 in the vertical edges of the plates 13. The screws are loose relative to the slots 71 so that the strip may be moved in a horizontal direction relative to the plates 13.

A flange 74 is formed on one end of the bar. A threaded hole 75 in the flange receives a drive screw 76 which engages through a threaded hole 77 in a bracket 78 which is mounted upon the base 10 of the machine. A manually operable handle 79 is connected to the end of the drive screw so that the screw may be manually rotated. Rotation of the screw, causes endwise movement of the flange 74 and the bar 70. Alternatively, instead of a handle 79, a reversible electric motor may be used for motor driving the screw for thereby moving the strip. Other conventional motor operated drives may be used to oscillate the bar endwise.

A vertically elongated slot 80 is formed in the bar to receive a connector pin 81. The pin is free to move upwardly and downwardly within the slot 80, but moves with the bar in the horizontal direction as the bar 70 is moved endwise. Thus, movement of the bar moves the pin 81 and the L-shaped lever in the direction longitudinally of the shaft, while permitting the lever to rock or rotate about the shaft.

In order to maintain the stylus against the guide surface or guide path formed on the guide means, suitable coil springs 82 may be positioned adjacent the pin 81 on the lower corner of the L-shaped lever for engaging against the strip 70. The resilient force of the springs, located below the center of pivoting of the lever tends to rotate the lever in a direction where its stylus 35 engages against the guide surface. Simultaneously, the key blank is spring urged to engage against the cutting wheel 30.

In operation, the user first determines the code number of the particular key to be duplicated. Then, a blank is inserted within the vise and fastened therein by rotating the thumb screw 22. Next, the master key guide surface is formed by rotating each of the disks into positions wherein the indicia corresponds to the code number. That is, the steps are pre-selected and arranged in alignment to form the stylus guide surface. Thereafter, rotation of the handle 79 moves the horizontal strip 70 endwise to cause the lever to move longitudinally of the shaft. The lever pivots or rocks due to the contact between the stylus and the steps of the disks to move the key blank towards and away from the cutter wheel for changing the depth of cut to reproduce the desired shape upon the blank.

Although only four disks are shown in the drawings, for illustrative purposes, any number of disks may be utilized, depending upon the types of keys to be reproduced. Likewise, the depths of the steps may be varied, depending upon the depths of the actual key edge shapes.

Figure 7:
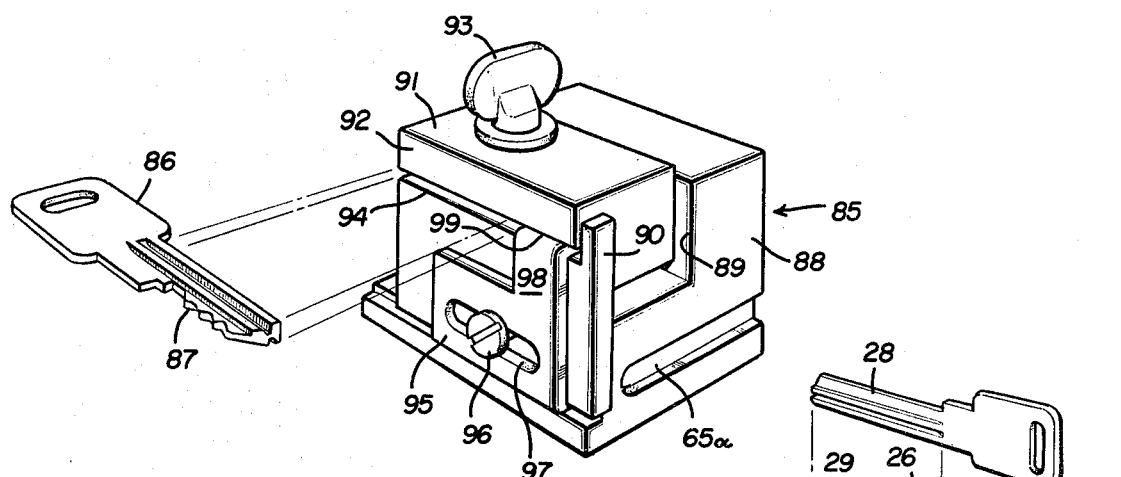
FIG. 7 is a perspective view of a second vise or clamping device for holding a master key and for temporary use in place of the guide means of FIG. 6.

There are times when an actual key might be available and it might be more convenient to use the actual key as the guide for the stylus, rather than the simulated key. This might be particularly true when the code number is not known but an actual key is available. For this purpose, a second vise is available as a temporary replacement for the guide means. The second vise clamps an actual key in position to form a guide path for the stylus. Such a second vise is illustrated in FIG. 7.

The second vise 85 is arranged to temporarily clamp and position an actual key 86 which may be a master key or any ordinary key to be duplicated. The key is to be positioned with its edge 87 aligned in the path of the stylus so that it guides the stylus.

The vise is formed of a block-like vise body 88 having an upwardly opening groove 89 and an end, upright, flange 90. A clamp block 91 fits within the groove 89 and engages the flange 90. The block includes an upper edge flange 92. The block is movable upwardly and downwardly for clamping by means of turning a thumb screw 93 extending through an opening in the block and into a threaded opening (not shown) in the base of the groove 89. Thus, the edge flange 92 and the forward edge of the block define a slot 94 within which the key 86 is clamped by the pressure of the edge flange 92 of the block.

Figure 8:
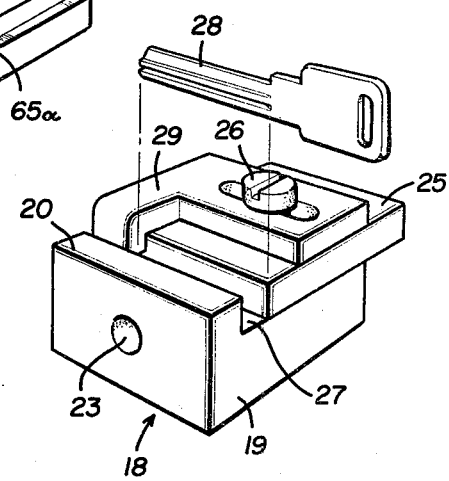
FIG. 8 is a perspective view of the key blank holding vise.
Figure 9:
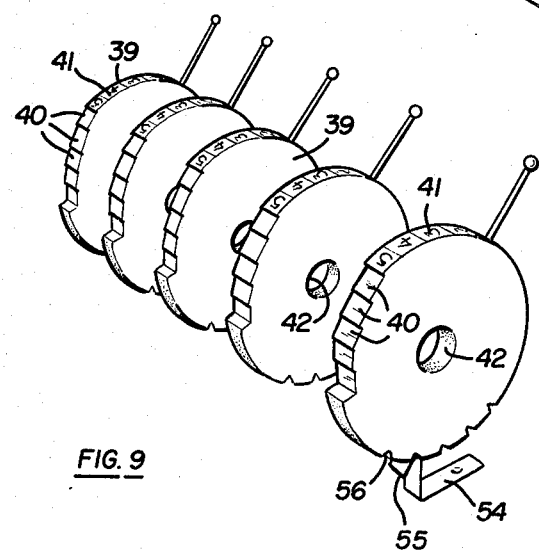
FIG. 9 is a perspective view of the disks, shown in disassembled relationship, which form the guide means.
Figure 10:
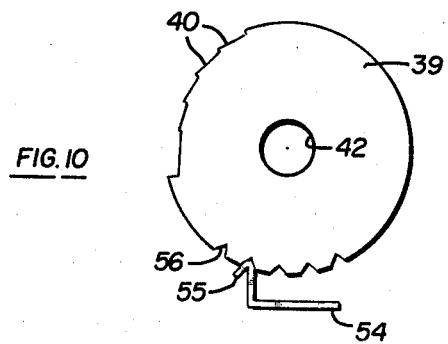
FIG. 10 is an elevational view of a single disk.

The position of the key may be regulated by means of a depth or length stop plate 95 which is fastened to the vertical face of the vise body 88 by means of a screw 96 passing through a slot 97 in the guide plate. A vertically extending finger 98 with a bent end 99 extending into the slot 94 acts as a stop to locate or position the key. The same stop plate construction is used for the adjustable stop 29 which is used with the key blank vise 18. (see FIG. 8)

Grooves 65a are formed in the side surfaces of the vise body 88. These grooves correspond in shape to the grooves 65 of the box-like frame 45 of the disk guide means. Thus, the vise may be substituted for the frame by rotating the clamp levers 63 for releasing the frame, then removing the frame and securing the vise in its place. The blank fits snugly between the rails 62. Thus, the machine may be used for dual purposes, that is, for producing a key from code or, like a conventional key-cutter, to produce a duplicate key from an original.

Having fully described an operative embodiment of this invention, I now claim:

1. A key cutting machine for cutting the shaped edge on a key blank in accordance with a pre-determined coded shape, comprising:

a horizontally arranged, immovable first shaft mounted upon a support;

an L-shaped lever having a central opening through which said first shaft is journalled, with the lever being both pivotable and slidable relative to the first shaft and having a substantially horizontally extending arm and a substantially vertically extending arm relative to the shaft;

a key blank vise mounted upon the end portion of the horizontally extending arm for temporarily clamping a key blank upon the end of the horizontal arm with the edge of the blank arranged parallel to the first shaft axis;

a rotating cutting wheel arranged to rotate about an axis parallel to the first shaft axis, with the cutting wheel located a short distance above the vise for engaging and cutting the key blank edge;

a stylus mounted upon the upper end of the substantially vertical arm, with said stylus normally engaging against a guide surface forming a horizontally extending guide path which is parallel to the first shaft axis so that the stylus moves transversely of the first shaft axis as it traverses the guide surface;

a guide means formed of a plurality of roughly circular disks rotatably mounted in axial alignment with each other on a second shaft having an axis which is parallel to the first shaft axis, and with the adjacent disks being positioned in a frame to hold said disks in substantial face to face contact with each other so that the disks together form a roughly cylindrical shape member formed of the separate disks;

each of said disks having a series of successively deeper steps formed on its peripheral edge along a portion of such edge and having indicia formed on remote portions of its edge, with the indicia corresponding to the successive steps;

means for rotating each disk about said second shaft axis to locate a predetermined step in alignment with the path of movement of the stylus to form a portion of the guide surface, with its corresponding indicia indicating the selection of that step, so that rotation of each disk aligns the pre-selected steps of each into the guide surface;

whereby movement of the lever along the length of the shaft causes the stylus to move transversely of the shaft because of its contact with the successive steps of each of the guide surface forming disks, to thereby pivot the lever and correspondingly move the key blank towards and away from the cutting wheel for cutting a desired edge shape upon the blank.

2. A key cutting maching as defined in claim 1 above, and including the opposite ends of said first shaft being connected to and supported by vertically arranged plates, and including a horizontally arranged strip extending between the plates and having an upper, substantially horizontal surface, with said frame releaseably clamped upon said surface;

said disks arranged within said frame, with their stepped edge portions exposed at one vertical side of the frame for engagement with the stylus, and with the upper portion of the frame being open for exposing the indicia, and with a marker means arranged upon the upper portion of the frame for aligning the pre-selected indicia with said marker means for thereby pre-selecting the steps corresponding thereto.

3. A key cutting machine as defined in claim 2 above, and including a second, key clamping vise for temporarily holding a finished key to be duplicated, with said second vise being replaceably mountable upon said surface in place of the frame so that the finished key may be substituted for the disks for forming the guide surface, with the finished key edge arranged in alignment with the axis of the first shaft and along the path of movement of the stylus as the lever moves in the direction of the first shaft for thereby guiding the stylus for cutting the key blank edge, after which, the frame with the disks may replace the second vise.

4. A key cutting machine as defined in claim 2 above, and including an elongated bar arranged parallel to the shaft, and spanning and overlapping the plates and being slidably connected to said plates for moving endwise in a direction parallel to the axis of the first shaft;

means connecting said lever to said bar for movement of the lever along the axial direction of the first shaft as the bar is moved endwise, but said means being loose in the vertical direction so that the lever is free to pivot about the first shaft axis in accordance with the movement of its stylus relative to the guide surface;

and operating means for moving said bar endwise.

5. A key cutting machine as defined in claim 4 above, and said frame comprising a flat base for resting upon the strip horizontal surface, and having vertical end walls between which the disks are located, and said second shaft extending between said end walls and with the space between the walls, adjacent to the stylus, being opened for permitting the stylus to engage the stepped edges of the disks, and with the opposite side of the frame being closed by a wall-like element, and with a narrow strip-like member extending between the upper ends of the side walls for forming an alignment marker edge for aligning the indicia of each disk in its pre-selected position.

* * * * *